United States Patent [19]
Hsu

[11] Patent Number: 5,965,174
[45] Date of Patent: Oct. 12, 1999

[54] BLOW MOLDING APPARATUS FOR A CHIP CARRIER MAKER

[75] Inventor: Hua-Shan Hsu, Taipei, Taiwan

[73] Assignee: Smooth Ocean Enterprise Co., LTD., Taipei, Taiwan

[21] Appl. No.: 08/969,701

[22] Filed: Nov. 13, 1997

[51] Int. Cl.$^6$ .............................. B29C 51/10; B29C 51/42
[52] U.S. Cl. ..................... 425/384; 264/544; 425/387.1; 425/388
[58] Field of Search .................................... 425/384, 388, 425/387.1, 174.4; 206/714; 264/454, 458, 554, 544

[56] References Cited

U.S. PATENT DOCUMENTS

| | | | |
|---|---|---|---|
| 3,137,747 | 6/1964 | Kline | 425/388 |
| 3,193,599 | 7/1965 | Crilly | 425/387.1 |
| 3,396,062 | 8/1968 | White | 425/388 |
| 3,476,840 | 11/1969 | Glassford | 425/384 |
| 3,533,352 | 10/1970 | Miller | 425/384 |
| 3,664,791 | 5/1972 | Brown | 425/384 |
| 5,192,484 | 3/1993 | Matuzawa et al. | 264/554 |
| 5,648,136 | 7/1997 | Bird | 206/714 |
| 5,800,772 | 9/1998 | Kurasawa | 425/388 |

Primary Examiner—Robert Davis
Attorney, Agent, or Firm—Finnegan, Henderson, Farabow, Garrett & Dunner, L.L.P.

[57] ABSTRACT

A blow molding apparatus for a chip carrier maker is adapted to form a longitudinal row of spaced-apart recesses in a flat thermoplastic strip and includes a stationary machine frame, a heating device mounted on the frame for heating the strip, a lower mold disposed on the frame and having a mold cavity unit therein, and an upper mold which is disposed on the frame. One of the upper and lower molds can be moved toward the other one so as to clamp the strip between the upper and lower molds, thereby establishing an air-tight seal between the strip and the upper mold. The upper mold has a bottom surface formed with an air chamber, and an air passage unit which is formed therethrough and which is in fluid communication with the air chamber so that compressed air can be introduced into the air chamber via the air passage unit, thereby pressing the strip into the mold cavity unit after the strip is heated and softened by the heating device and subsequently forming the recesses in the strip. The heating device includes a heating member fixed in the air chamber to heat air in the air chamber to a temperature at which the strip is softened. The upper mold includes an upper cooling unit located around the air chamber to cool the upper mold after the recesses are formed in the strip.

8 Claims, 12 Drawing Sheets

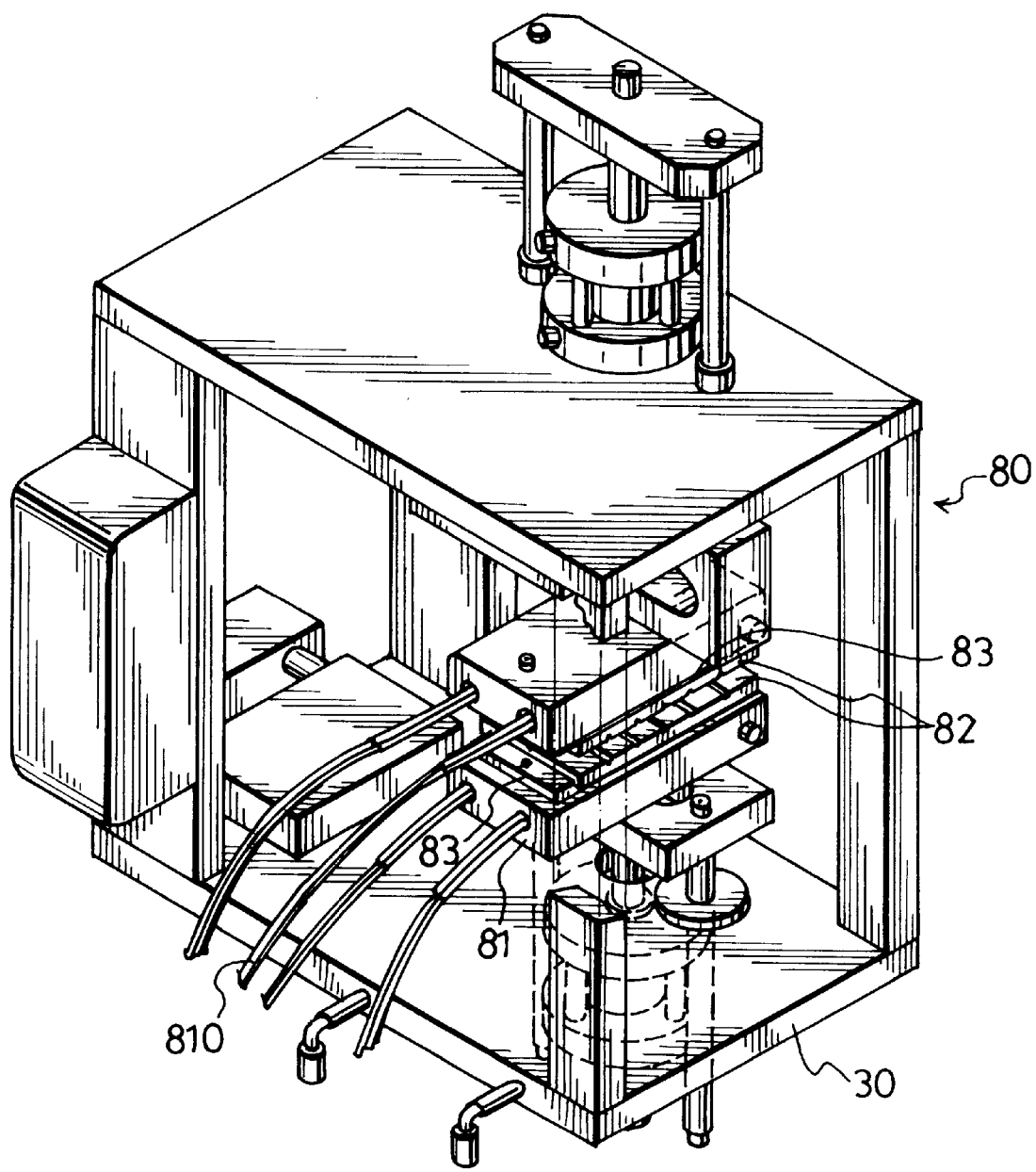
F I G. 5

BLOW MOLDING APPARATUS FOR A CHIP CARRIER MAKER

BACKGROUND OF THE INVENTION

1. Field of the Invention

This invention relates to a chip carrier maker, more particularly to a blow molding apparatus for a chip carrier maker, whereby a longitudinal row of spaced-apart recesses is formed in a thermoplastic strip by the pressure of compressed hot-air.

2. Description of the Related Art

Referring to FIGS. 1A, 1B and 2, a thermoplastic narrow strip 1 or wide strip 2 is formed by a conventional chip carrier maker 3. The narrow strip 1 has a longitudinal row of spaced-apart rectangular recesses 11 formed in an upper surface thereof, and a plurality of holes 12 formed therethrough. The wide strip 2 has two longitudinal rows of spaced-apart rectangular recesses 21 and a plurality of holes 22. The maker 3 includes a strip feeding device 31 for supplying a flat thermoplastic strip 30, a blow molding apparatus which includes a heating device 32 for heating and softening the punched strip 30, and a compression mold device 33 for forming the rectangular recesses 11, 21 in the softened strip 30, a punching device 34 for forming the holes 12, 22 in the strip 30, and a strip activating device 35 for moving the strip 30 from the feeding device 31 to a strip winding device 36. When moved from the heating device 33 to the compression molding device 34, the softened strip 30 will slightly deform prior to the blow molding process due to the pull of the strip activating device 35. As a result, the rectangular recesses 11, 21 cannot be formed accurately at predetermined positions in the strip 30.

SUMMARY OF THE INVENTION

The object of this invention is to provide a chip carrier maker with a blow molding apparatus, whereby recesses can be formed accurately at predetermined positions in a strip.

According to this invention, a blow molding apparatus for a chip carrier maker is adapted to form a longitudinal row of spaced-apart recesses in a flat thermoplastic strip and includes a stationary machine frame, a heating device mounted on the frame for heating the strip, a lower mold disposed on the frame and having a mold cavity unit therein, and an upper mold which is disposed on the frame. One of the upper and lower molds can be moved toward the other one so as to clamp the strip between the upper and lower molds, thereby establishing an air-tight seal between the strip and the upper mold. The upper mold has a bottom surface formed with an air chamber, and an air passage unit which is formed therethrough and which is in fluid communication with the air chamber so that compressed air can be introduced into the air chamber via the air passage unit, thereby pressing the strip into the mold cavity unit after the strip is heated and softened by the heating device and subsequently forming the recesses in the strip. The heating device includes a heating member fixed in the air chamber to heat air in the air chamber to a temperature at which the strip is softened. The upper mold includes an upper cooling unit located around the air chamber to cool the upper mold after the recesses are formed in the strip.

BRIEF DESCRIPTION OF THE DRAWINGS

Other features and advantages of this invention will become apparent in the following detailed description of the preferred embodiments of this invention with reference to the accompanying drawings, in which:

FIG. 5 is a perspective view showing a preheater of the blow molding apparatus of the preferred embodiment;

DETAILED DESCRIPTION OF THE PREFERRED EMBODIMENTS

Figure 1A:
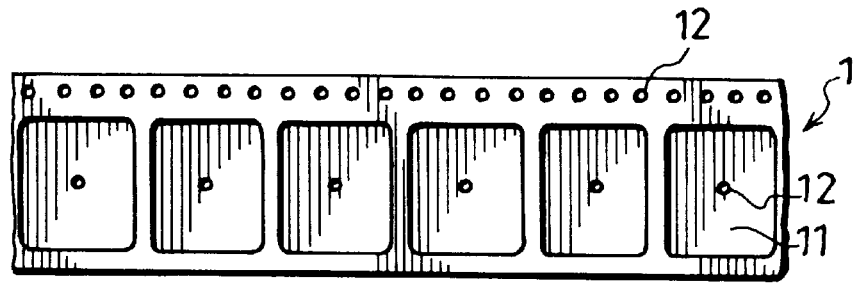
FIG. 1A illustrates a chip carrier unit in the form of a strip having a row of rectangular recesses.
Figure 1B:
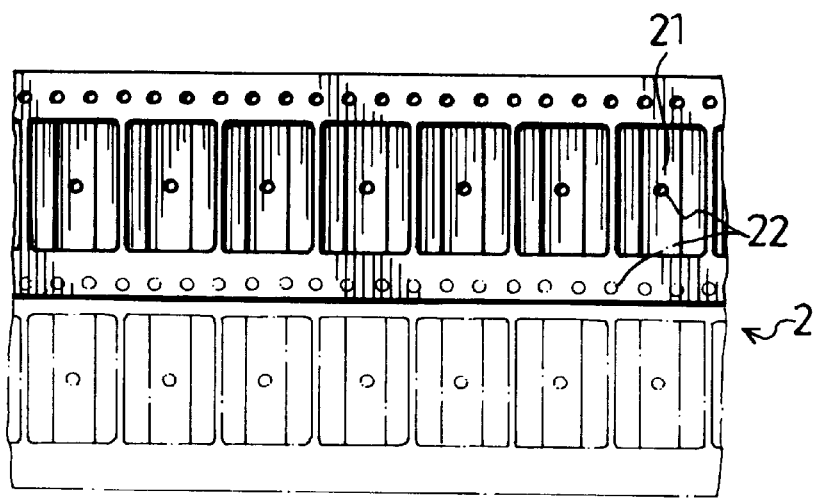
FIG. 1B illustrates a chip carrier unit in the form of a strip having two rows of rectangular recesses.
Figure 2:
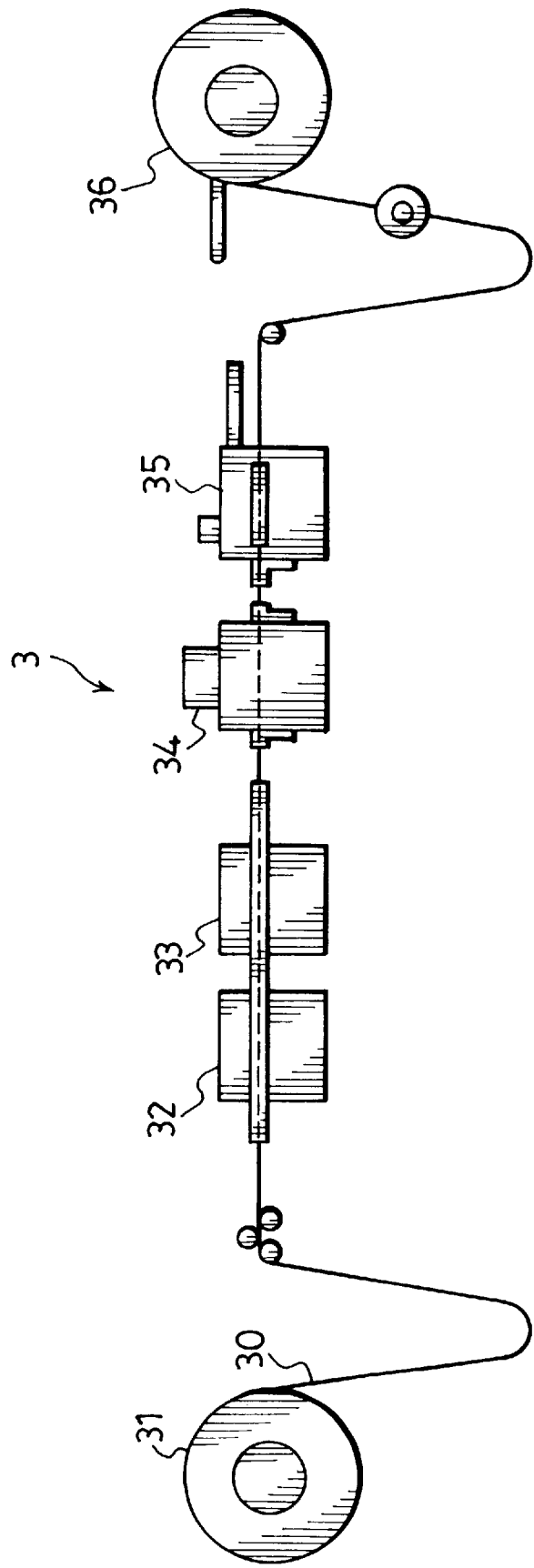
FIG. 2 illustrates a conventional chip carrier maker by which the strips of FIGS. 1 and B are formed.
Figure 3:
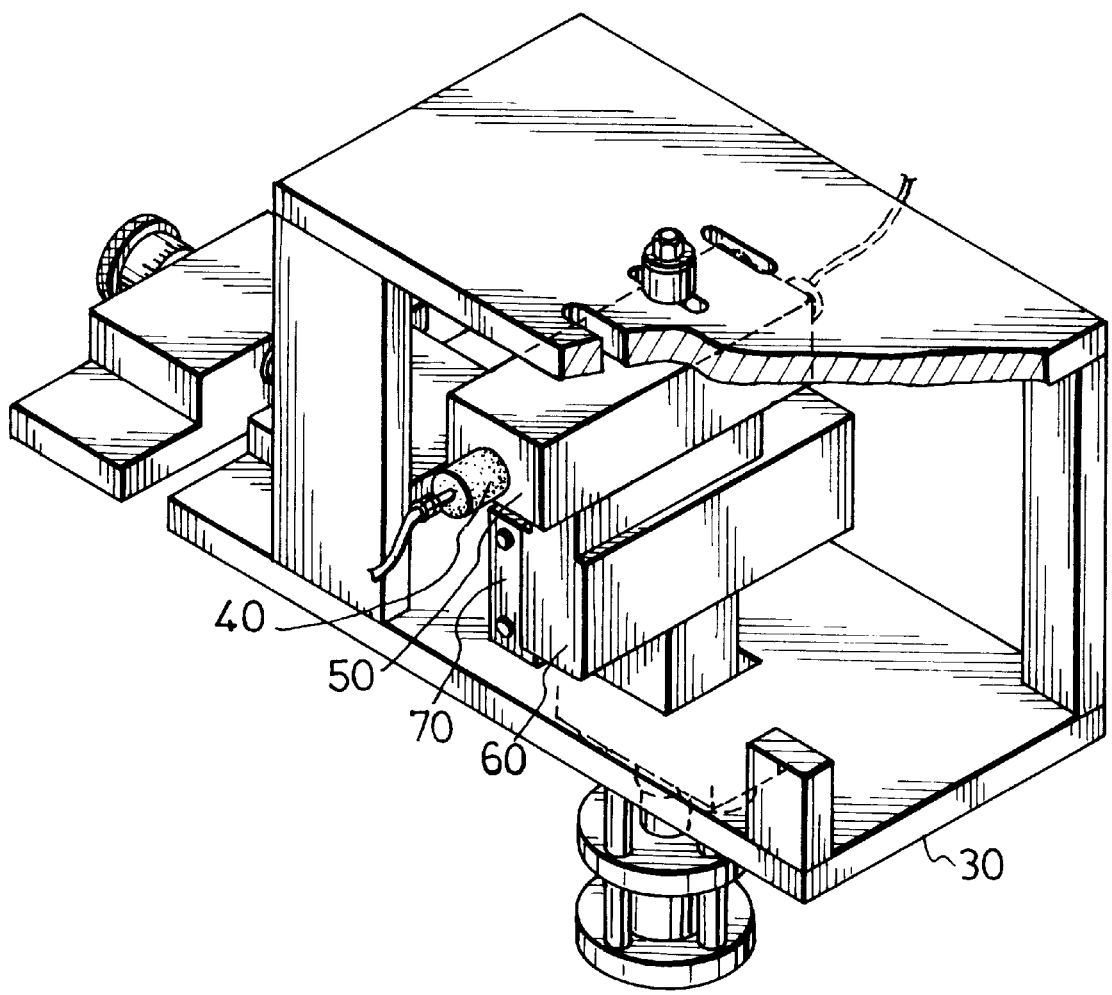
FIG. 3 is a perspective view of a blow molding apparatus for a chip carrier maker according to a preferred embodiment of this invention, which includes an upper mold and a lower mold.
Figure 4A:
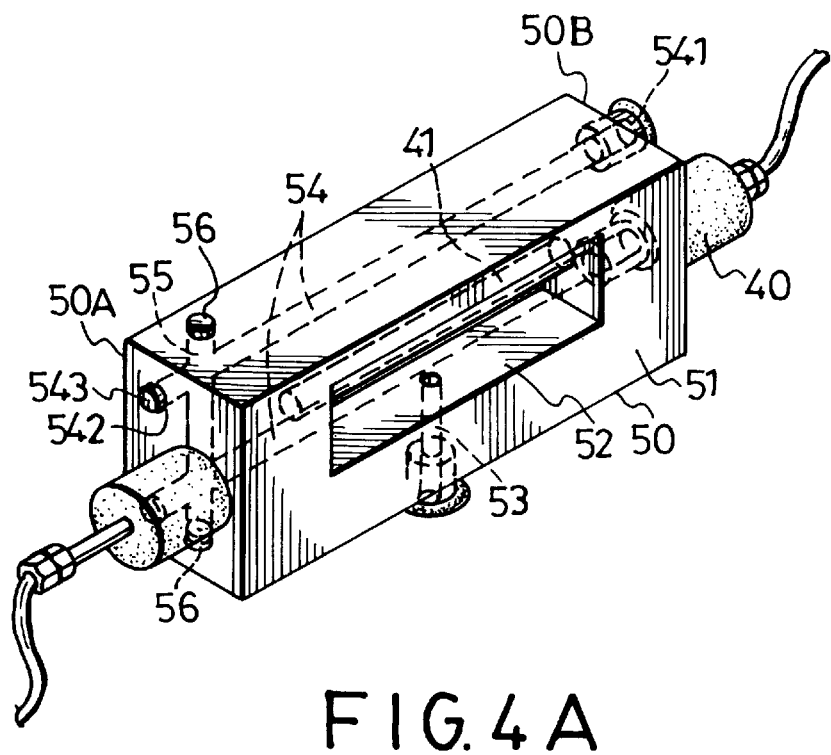
FIG. 4A is a perspective view showing the upper mold of the blow molding apparatus of the preferred embodiment.
Figure 4B:
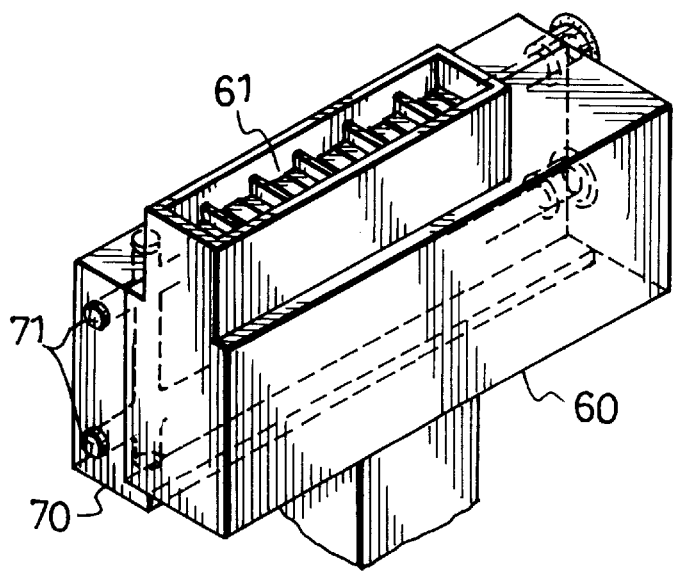
FIG. 4B is a perspective view showing the lower mold of the blow molding apparatus of the preferred embodiment.

FIGS. 3, 4A and 4B illustrate a preferred embodiment of a blow molding apparatus for a chip carrier maker according to this invention, which includes a stationary machine frame 30, a heating device 40 that includes a heating member or a 500 watt quartz lamp tube 41, an upper mold 50 fixed on the frame 30, and a lower mold 60 which is fixed on a movable support 70 in a known manner. The movable support 70 is mounted vertically and movably on the frame 30 in a known manner so as to carry the lower mold 60 upward to press a flat thermoplastic strip (not shown) against a bottom surface 51 of the upper mold 50, thereby establishing an air-tight seal between the strip (not shown) and the upper mold 50.

The bottom surface 51 of the upper mold 50 is formed with a rectangular air chamber 52 in which the heating member 41 is disposed for heating air in the air chamber 52 to a temperature that is sufficient to soften the strip (not shown) which is clamped between the upper and lower molds 50, 60. An air passage unit 53 is formed through a wall of the upper mold 50 and is in fluid communication with the air chamber 52 so that a compressed air source (not shown) can supply air into the air chamber 52 via the air passage unit 53, thereby pressing the strip (not shown) against the lower mold 60 in such a manner that the strip (not shown) seals a mold cavity unit 61 in the lower mold 60, which is aligned with the air chamber 52 of the upper mold 50.

The quartz lamp tube 41 is energized for a period of 0.5 to 0.8 seconds, thereby heating the strip (not shown) to a temperature of about 98° C. Then, a pump (not shown) is started to supply air into the air chamber 52 via the air passage unit 53.

Figure 4C:
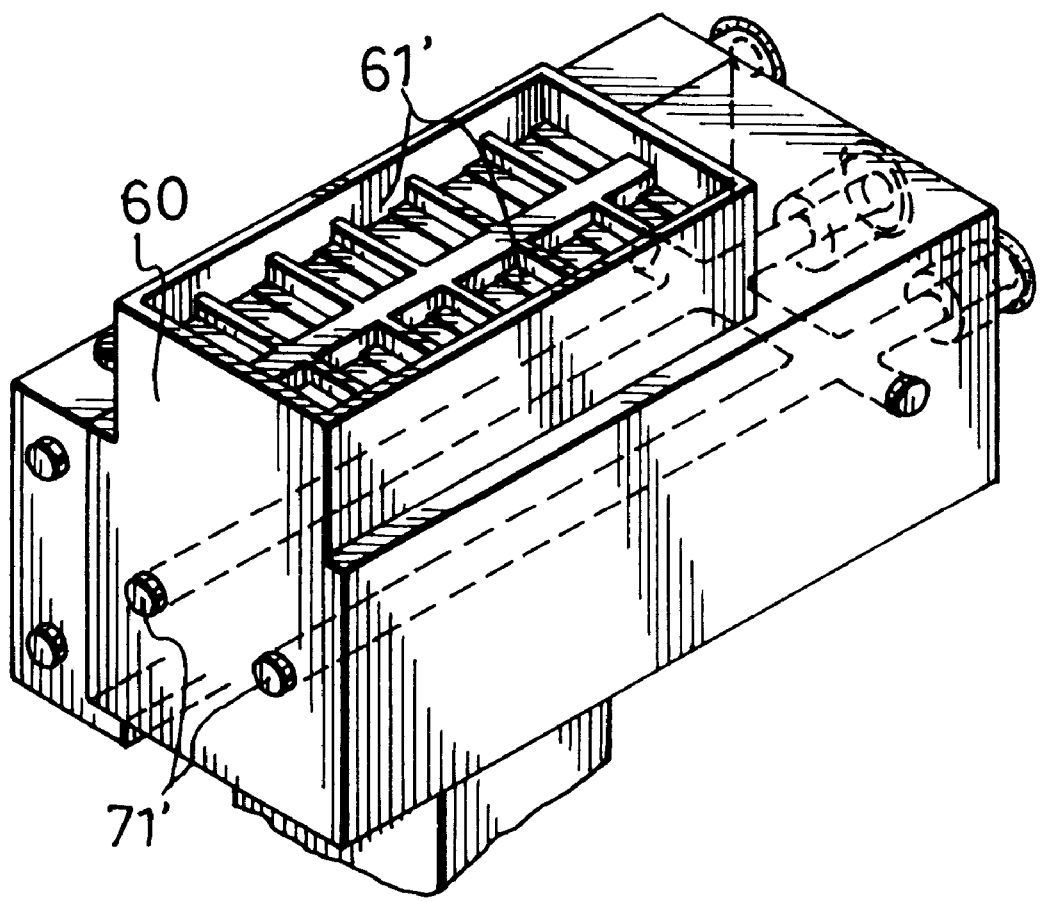
FIG. 4C is a perspective view showing a modified lower mold of the blow molding apparatus of the preferred embodiment.

The upper mold 50 is elongated and is drilled to form a water passage unit which consists of two longitudinal holes 54 and a transverse hole 55. The longitudinal holes 54 are formed through the upper mold 50 on two sides of the air chamber 52. The transverse hole 55 is formed through a first end portion 50A of the upper mold 50 and intersects with the longitudinal holes 54. As illustrated, two ends of the transverse hole 55 are sealed by two rubber caps 56. Each of the longitudinal holes 54 has an open end 541 and a sealed end 542 which is sealed by a rubber cap 543. Accordingly, water can be introduced into the holes 54, 55 via one of the open ends 541 of the holes 54 and can be discharged from the holes 54, 55 via the other one of the open ends 541 of the holes 54. The carrier 70 is provided with a lower cooling unit 71 which includes a water passage unit that is formed in the carrier 70 in a manner similar to that in the upper mold 50. In this embodiment, the upper and lower molds 50, 60 are cooled for a period of 0.5 seconds. Referring to FIG. 4C, in a situation where a wider mold cavity unit 61' is formed in a lower mold 60', because the lower mold 60' is widened as compared to that in FIG. 4A, a lower cooling unit 71' is provided directly in the lower mold 60' in a manner similar to that in the upper mold 50 (see FIG. 4A).

Figure 4D:
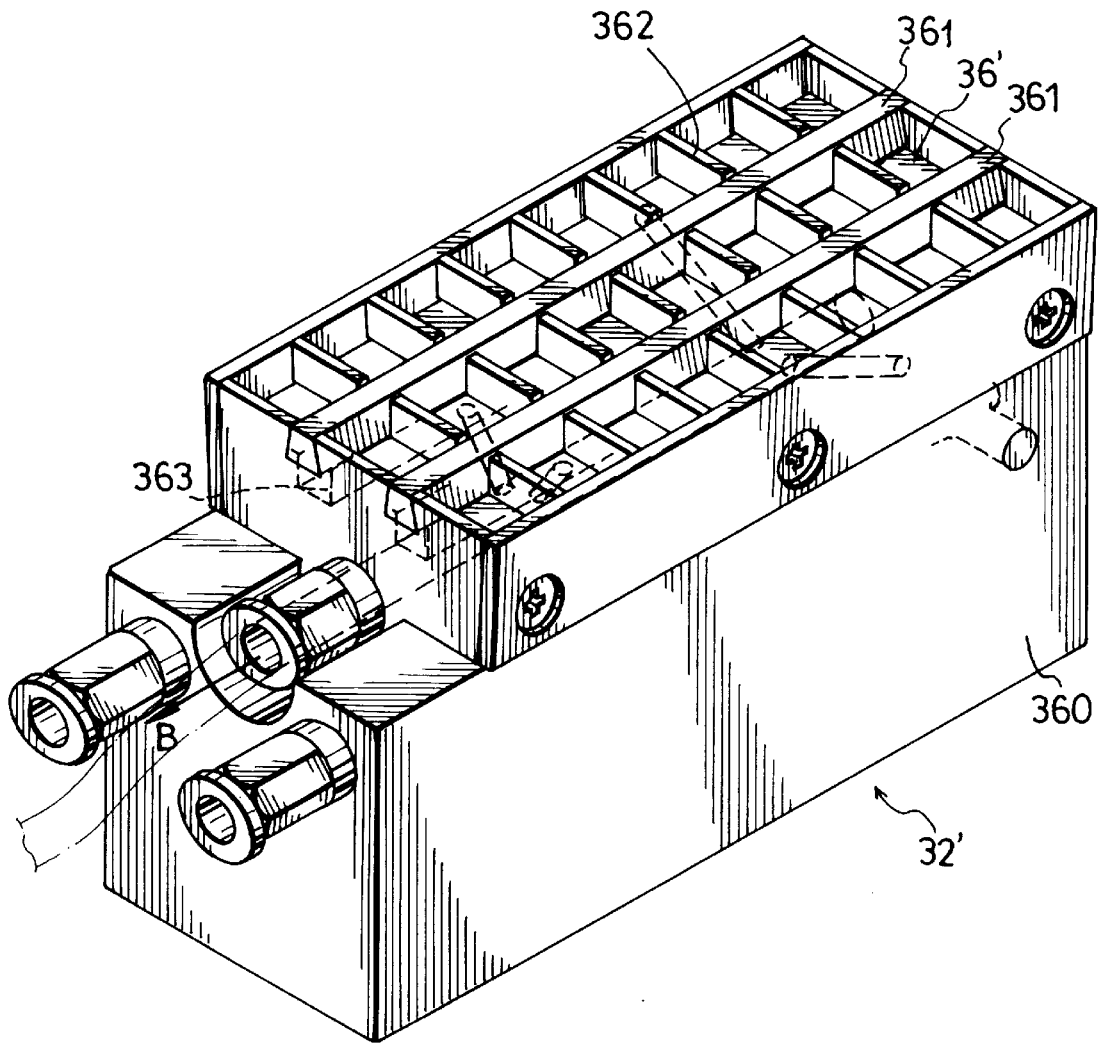
FIG. 4D is a perspective view of another modified lower mold of the blow molding apparatus of the preferred embodiment.
Figure 4E:
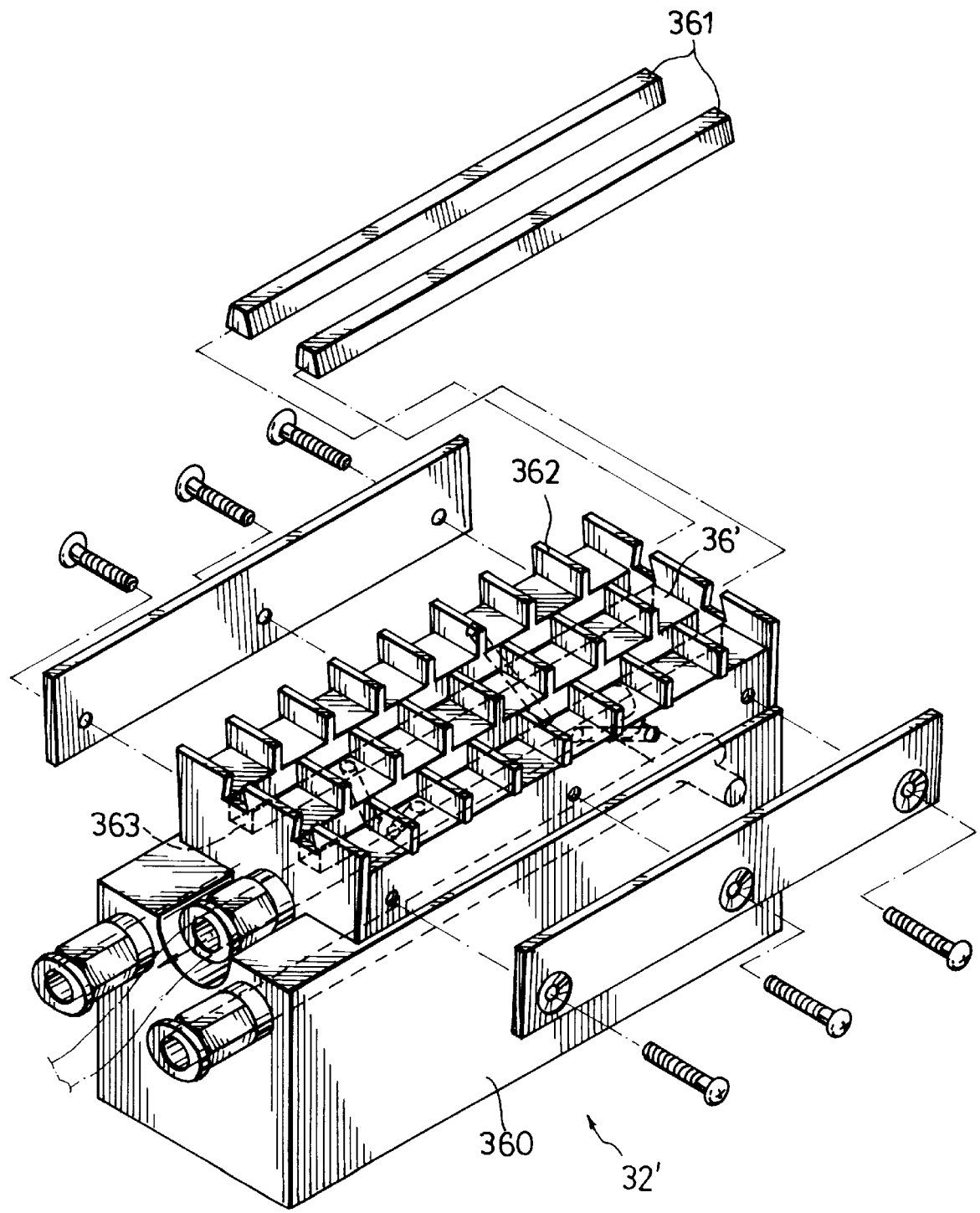
FIG. 4E is an exploded view of the lower mold of FIG. 4D.

Referring to FIGS. 4C, 4D and 4E, when it is desired to form three parallel rows of recesses in the strip (not shown), another modified lower mold 32' is provided to have a mold body 360 and an elongated mold cavity unit 36' which includes two longitudinal rails 361 and a plurality of transverse plates 362 that clamp the rails 361 therebetween in such a manner that the rails 361 are located immediately over two slots 363 and that clearances (A1) are left between the mold body 360 and the rails 361, thereby defining two air passages between the rails 361 and the mold body 360.

The mold body 360 has a generally rectangular cross-section, and two notches 364 in two sides of the upper end portions thereof, in which two inclined side plates 365 are respectively bolted, thereby leaving two clearances (A2), each of which is located between the mold body 360 and one of the side plates 365.

Figure 4F:
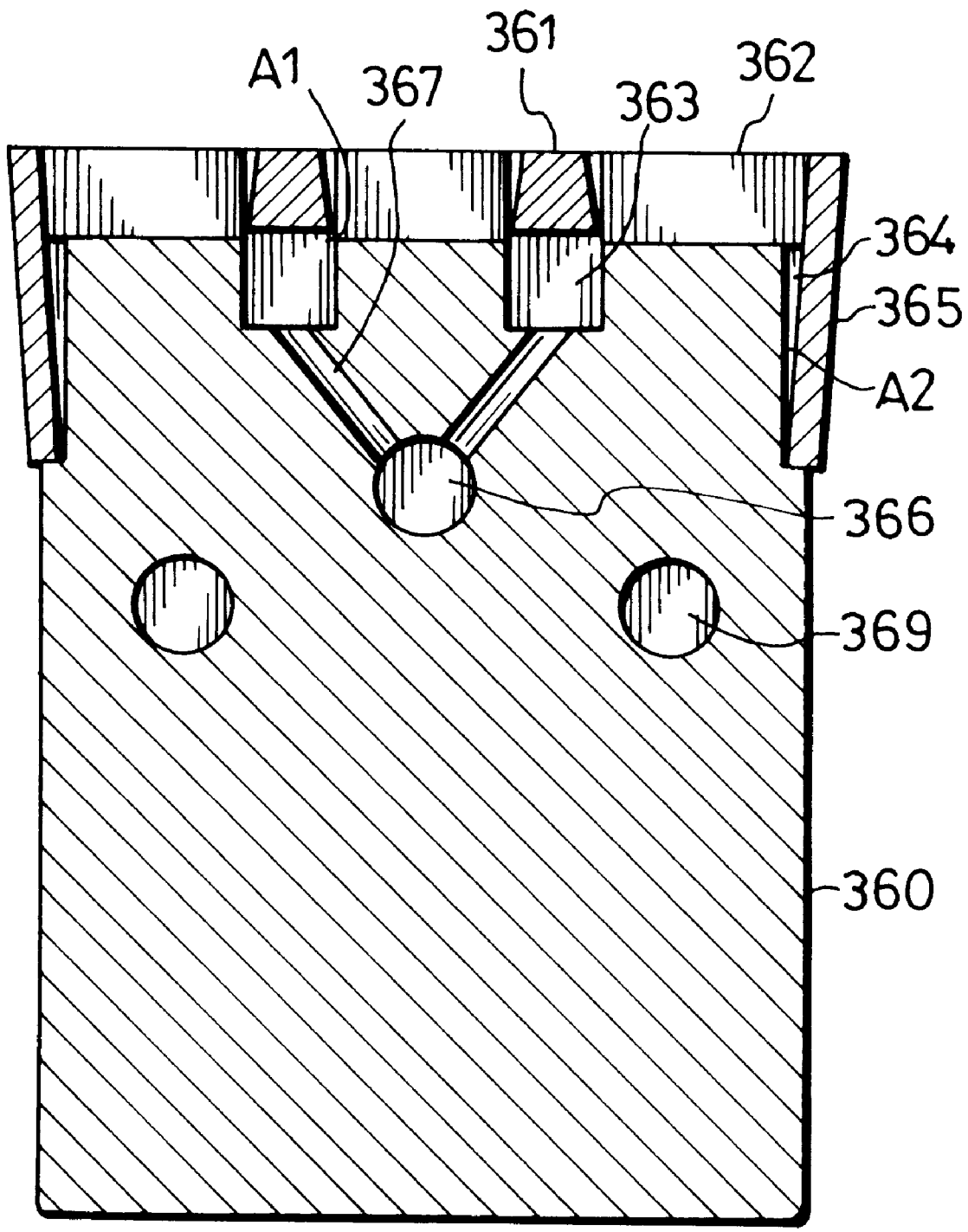
FIGS. 4F and 4G are sectional views illustrating the interior structure of the lower mold of FIG. 4D.
Figure 4G:
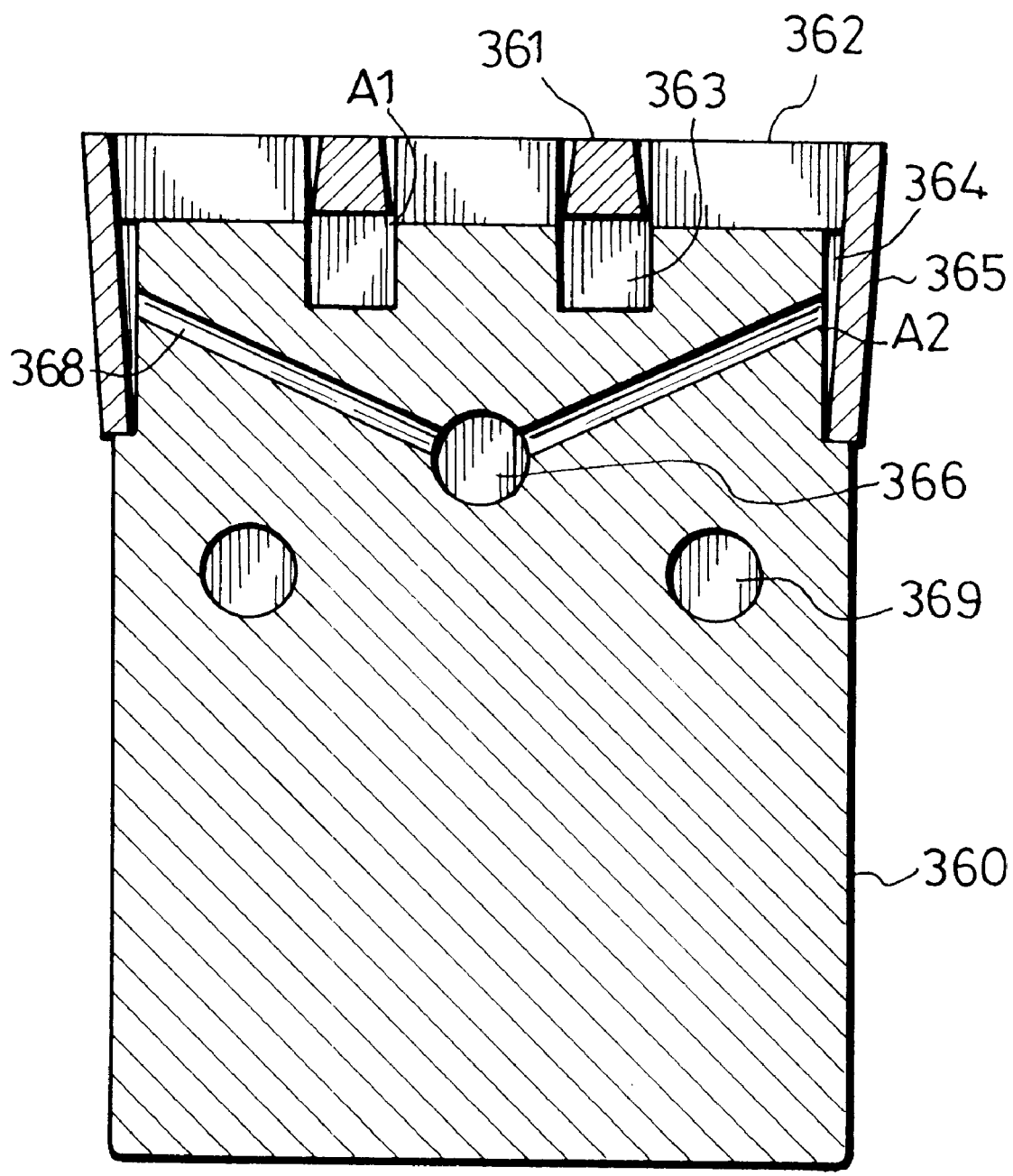

As illustrated, the mold body 360 further has an axial air passage 366, two inclined short air passages 367 (see FIG. 4F) communicated fluidly with the axial air passages 366 and the slots 363, two inclined long air passages 368 (see FIG. 4G) communicated fluidly with the axial air passage 366 and the notches 364, and a cooling water passage unit 369. When the strip (not shown) is clamped between the lower mold 32' and an associated upper mold (not shown), the air in the axial passage 366 is drawn out in a direction indicated by the arrowhead (B) in FIG. 4D, thereby attracting the strip (not shown) onto the molding portion 36' of the lower mold 32'. This attraction by air can cooperate with downward air pressure from the associated upper mold (not shown) onto the strip (not shown) to form efficiently the recesses in the strip (not shown). In this embodiment, the strip (not shown) is simultaneously pressed under an air pressure of about 4 kg/cm² and drawn under an air attractive force of about 6 kg/cm².

Figure 5A:
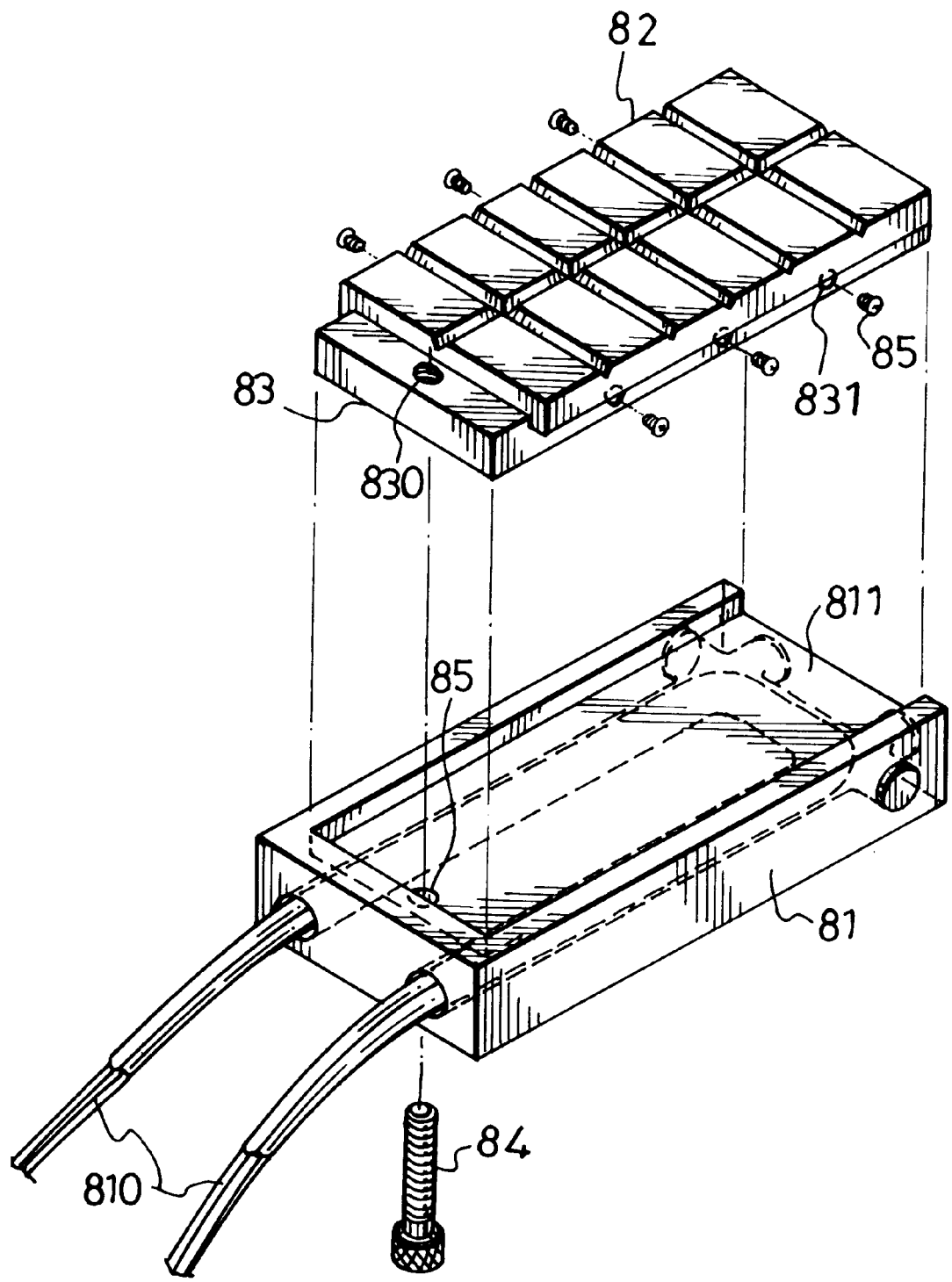
FIG. 5A is a partially exploded view of a portion of the preheater of the blow molding apparatus of the preferred embodiment.
Figure 5B:
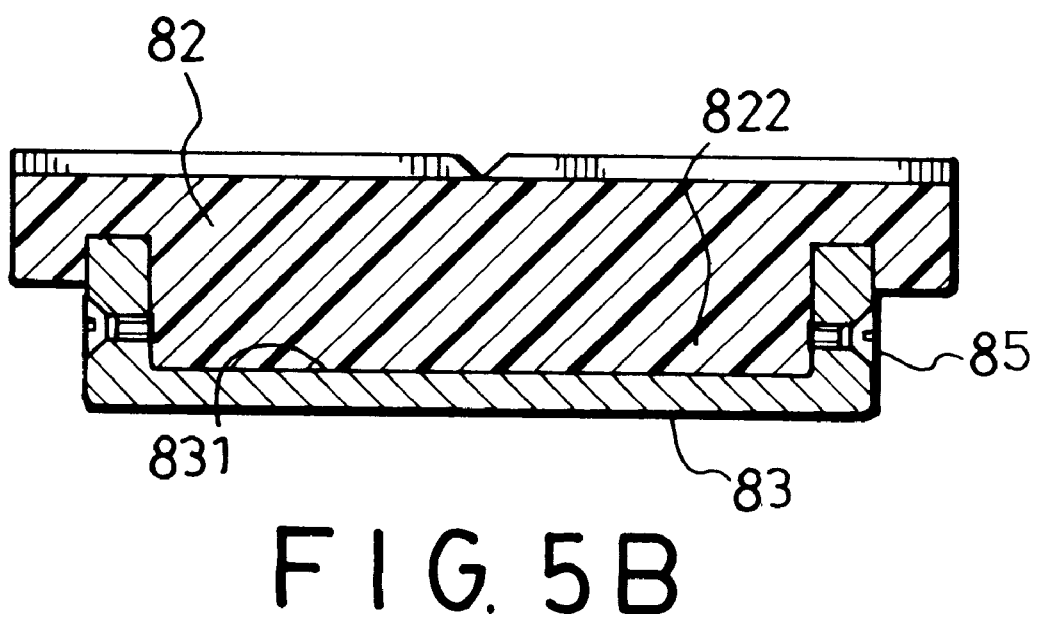
FIG. 5B is a schematic sectional view illustrating how a Teflon plate is locked on a connecting plate of the preheater of the blow molding apparatus of the preferred embodiment.

Referring to FIGS. 5, 5A and 5B, preferably, a high-resistance Nickel-Chromium preheater 80 is provided for preheating the strip (not shown) to a predetermined temperature at which the strip cannot deform, prior to heating of the strip (not shown) by the heating device 40 (see FIG. 4A). Preferably, the predetermined temperature is slightly below the softening point of the strip (not shown), thereby increasing the efficiency of the apparatus. The preheater 80 includes two heating plates 81, two Teflon plates 82 and two connecting plates 83. The upper heating plate 81 is fixed on the frame 30. The lower heating plate 81 is mounted vertically and movably on the frame 30 by any appropriate means. Each of the heating plates 81 is made of aluminum, and has a flexible Nickel-Chromium element 810 extending therein and a positioning slot 811 in which one of the connecting plates 83 is fitted and locked by a vertical bolt 84 which extends through a hole 85 in the heating plate 81 to engage a vertical threaded hole 830 formed through the connecting plate 83. Each of the connecting plates 83 is also made of aluminum and is also formed with a positioning slot 831 in which one of the Teflon plates 82 is fitted and locked by a plurality of horizontal bolts 85 each of which extends through a horizontal threaded hole 831 in the connecting plate 83 to press against a downward projection 822 of the Teflon plate 82, thereby locking the Teflon plate 82 on the connecting plate 83. The lower heating plate 81 can be moved upward to clamp the strip (not shown) between the Teflon plates 82. Heat is transmitted from the heating plates 81 to the strip (not shown) via the Teflon plates 82. In this way, the strip (not shown) can be preheated before it is heated by the heating device 40 (see FIG. 4A), thereby reducing the time to heat the strip (not shown) by the heating device 40 (see FIG. 4A).

In this embodiment, the temperature of the preheater 80 is maintained within a range from 300 to 350° F., preferably within a range from 320 to 325° F., for heating the strip (not shown) to a temperature of about 70° C.

With this invention thus explained, it is apparent that numerous modifications and variations can be made without departing from the scope and spirit of this invention. It is therefore intended that this invention be limited only as indicated in the appended claims.

I claim:

1. A blow molding apparatus for a chip carrier maker, said blow molding apparatus being adapted to form a longitudinal row of spaced-apart recesses in a flat thermoplastic strip and including a stationary machine frame, a heating device mounted on the frame for heating the strip, a lower mold disposed on the frame and having a mold cavity unit therein, and an upper mold which is disposed on the frame, one of the upper and lower molds being movable toward the other one so as to clamp the strip between the upper and lower molds, thereby establishing an air-tight seal between the strip and the upper mold, the upper mold having a bottom surface formed with an air chamber which is aligned with the mold cavity unit of the lower mold, and an air passage unit which is formed therethrough and which is in fluid communication with the air chamber so that compressed air can be introduced into the air chamber via the air passage unit, thereby pressing the strip into the mold cavity unit after the strip is heated and softened by the heating device and subsequently forming the recesses in the strip, wherein the improvements comprise the heating device including a heating member fixed in the air chamber to heat air in the air chamber to a temperature at which the strip is softened, the upper mold including an upper cooling unit located around the air chamber to cool the upper mold after the recesses are formed in the strip.

2. A blow molding apparatus as claimed in claim 1, wherein said heating member is a quartz lamp tube.

3. A blow molding apparatus as claimed in claim 1, wherein said upper cooling unit includes a water passage unit which extends in the upper mold around the air chamber, whereby cooling water can flow through said water passage unit to cool the upper mold after the recesses are formed in the strip.

4. A blow molding apparatus as claimed in claim 3, wherein the upper mold is an elongated mold which has a first end portion and a second end portion and which is drilled to form two spaced-apart longitudinal holes and a transverse hole, said longitudinal holes being formed through said upper mold on two sides of the air chamber, said transverse hole being formed through said first end portion of the upper mold and intersecting both of the longitudinal holes, said transverse hole having sealed ends, each of said longitudinal holes having an open end and a sealed end which is located at said first end portion of said upper mold, whereby water can be introduced into said longitudinal holes and said transverse hole via one of said open ends of said longitudinal holes and can be discharged from said longitudinal holes and said transverse hole via the other one of said open ends of said longitudinal holes.

5. A blow molding apparatus as claimed in claim 1, further comprising a lower cooling unit for cooling the lower mold after the recesses are formed in the strip.

6. A blow molding apparatus as claimed in claim 5, wherein said lower cooling unit includes a water passage unit which extends in the lower mold, whereby cooling water can flow through said water passage unit to cool the lower mold.

7. A blow molding apparatus as claimed in claim 5, further comprising a carrier mounted vertically on the frame, the lower mold contacting fixedly said carrier, said lower cooling unit including a water passage unit extending in said carrier so as to permit flow of cooling water through said water passage unit, thereby cooling said carrier and thus the lower mold.

8. A blow molding apparatus as claimed in claim 1, further comprising a high-resistance Nickel-Chromium preheater for preheating the strip to a temperature at which the strip cannot deform, prior to heating of the strip by said heating device.

* * * * *